July 28, 1953

M. E. SIME 2,646,922

CALCULATING MACHINE

Filed July 12, 1950

INVENTOR
MAXWELL E. SIME

BY

HIS ATTORNEYS

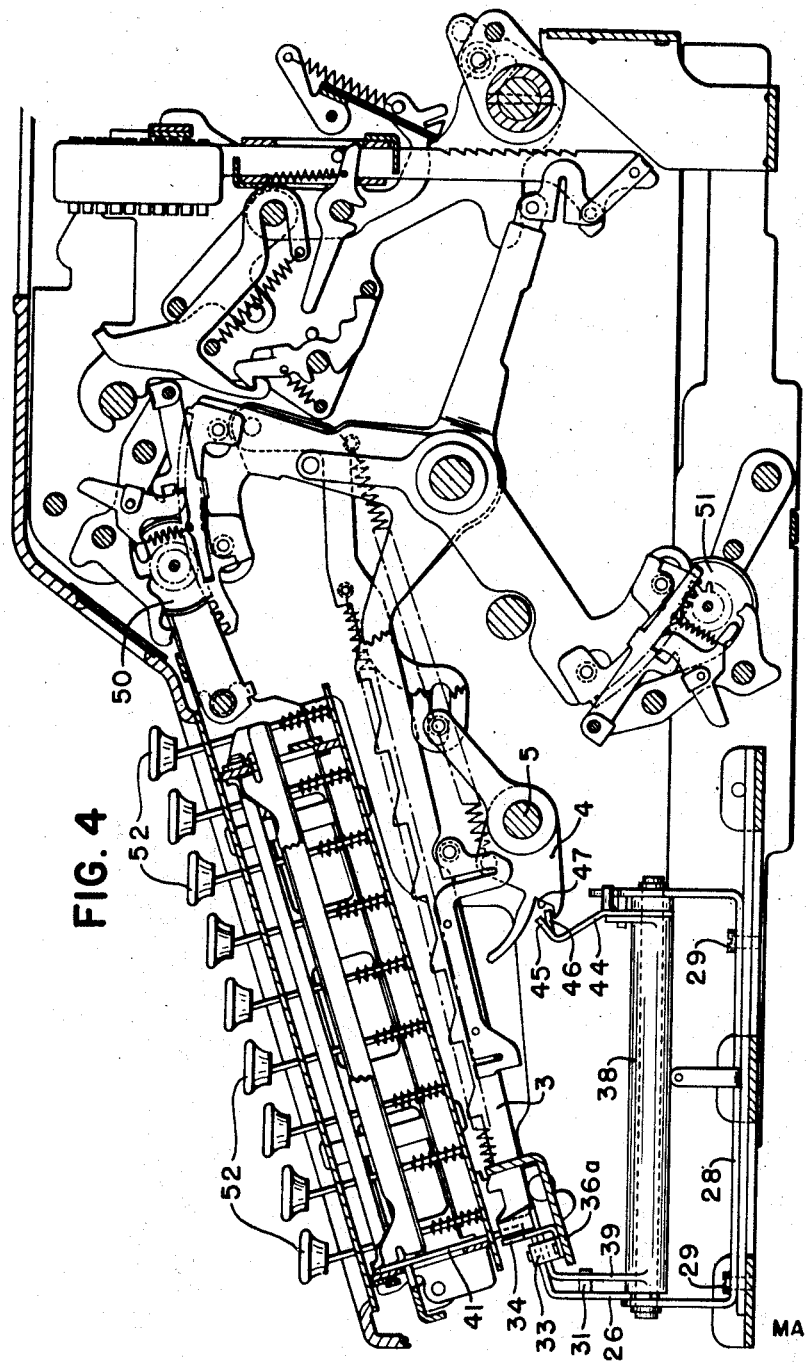

Patented July 28, 1953

2,646,922

UNITED STATES PATENT OFFICE 2,646,922

CALCULATING MACHINE

Maxwell Edward Sime, Bayswater, London, England, assignor to The National Cash Register Company, Dayton, Ohio, a corporation of Maryland Application July 12, 1950, Serial No. 173,365
In Great Britain July 25, 1949

6 Claims. (Cl. 235—60)

This invention relates to calculating machines and is particularly concerned with the provision of a machine capable of performing adding and subtracting calculations in the sterling and decimal systems of notation under the control of a single keyboard.

The machine of the present invention finds a particular, but not exclusive, use in the entry of sterling and decimal items into different totalizers, and, therefore, it is a machine in which it is necessary for the keyboard to control entries into the totalizers in accordance with the particular notation concerned. It will be appreciated that in providing a machine for both the sterling and decimal systems of notation, it is necessary for the keyboard to have in excess of ten digits to represent pence and shillings. In a machine designed exclusively for sterling calculations, the pounds banks of keys can obviously be used for decimal calculation, but the banks lower than the units of pounds cannot be used in their normal manner as they are not related to the decimal notation, the shillings being calculated on a base of 20 and the pence being calculated on a base of 12.

It is one object of the present invention particularly to provide arrangements which facilitate such dual operation, and which, in a machine having a keyboard designed for sterling calculations will give an increased capacity for calculation in the decimal notation.

According to the invention a calculating or similar machine is provided, for calculating in two different systems of notation, that includes a keyboard, differential actuators settable under control of the keyboard, two totalizers, the sterling of which is adapted to receive entries in respect of one system of notation, and the other of which is adapted to receive entries in respect of the decimal system of notation, mechanism for selecting the totalizers for cooperation with the actuators, and a mechanism operable to determine the control of the actuators in accordance with the notational significance of the selected totalizer.

The above and other subsidiary features of the present invention as applied, by way of example only, to one manner of carrying it into effect, will now be described and are illustrated in the accompanying drawings which show the invention as applied to a calculating machine wherein subtraction is effected by complementary addition.

Fig. 4 is a front to rear vertical sectional view showing the novel mechanism incorporated in a machine like that shown in application for United States Letters Patent, Serial No. 95,703 of Harry L. Lambert, filed May 27, 1949, the particular section being to the right of the tens of shillings denominational order.

Figure 3:
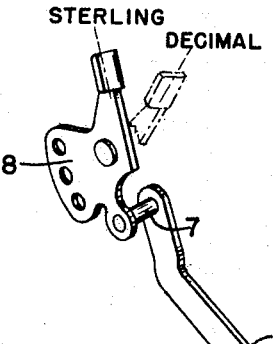
Fig. 3 is a front view of the fingered control lever of Fig. 1 which controls the action of the tens of shillings stop bar, in its position relative to the complementary lever of that denominational order, during subtract operations.

The invention is incorporated in a machine having a differential actuator for each of a plurality of orders, which actuators are moved under differential control during a machine operation to enter data additively or subtractively into totalizers engaged therewith, the totalizers each including a toothed pinion for each differential actuator and the differential actuators being provided with racks to drive the pinions of the totalizers the required distance.

The preferred embodiment of the invention is for installation in the type of calculating machine generally disclosed in the application for United States Letters Patent, Serial No. 95,703 of Harry L. Lambert, filed May 27, 1949, having several totalizers and associated transfer mechanisms for cooperation with the differential actuators, a keyboard and stop bars controlled thereby for controlling the associated differential actuators, totalizer engaging controls, and means for subtracting by the addition of complements. Inasmuch as the said application shows three totalizers, two regular totalizers and a third auxiliary totalizer, the latter and its control will be omitted from this disclosure as superfluous. The upper one 50 (Fig. 4) of the two totalizers will be used as the sterling totalizer as that totalizer has visible number drums, and the lower one 51 of the two main totalizers will be used as the decimal totalizer, although the situation could be reversed by obvious changes in the totalizer selecting lever cam, as will be apparent.

As is usual in sterling totalizers, the lowest order sterling totalizer pinion representing pence has a capacity of twelve units of movement for the full sweep of the associated differential rack and transfers on every twelfth digit entry, the next higher order sterling totalizer pinion representing units of shillings has ten units of movement for the full sweep of the associated differential rack and transfers on every tenth digit entry, the third order sterling totalizer pinion representing tens of shillings has a capacity of tens units of movement for the full sweep of the differential racks and transfers on every second digit entry, and all the higher order totalizer pinions representing pounds have a capacity of ten units of movement for the full sweep of the associated differential actuator and transfer to the next higher order on every tenth digit entry.

The decimal totalizer consists of a totalizer each pinion of which having a capacity of tens units of movement for a full sweep of the associated differential actuator and transfers to the next higher order on the entry of each tenth digit.

The lowest denominational order of the keyboard consists of eleven pence keys controlling the entry of from one to eleven pence according to the desired entry. In subtract entries these same keys control the complementary entry on a base of twelve.

The pence keys are not used in decimal entries and the pence stop bar is blocked by novel mechanism on decimal add operations, but on decimal subtract operations the pence differential actuator is given twelve units of movement. This denominational keybank is shown in United States Patent No. 2,476,853 which issued on the application of R. G. Fowler. The higher orders of the keyboard contain nine keys each, controlling the entry of digits one to nine in add operations and the complements thereof on a base of nine on subtract operations. The tens of shillings stop bar is blocked by novel mechanism to a step of movement equal to an entry of "one" on sterling add entries as such entry is equal to ten shillings which in conjunction with the units of shillings keys gives all possible entry combinations from one to nineteen shillings, by use of these two keybanks. On sterling subtract operations the tens of shillings differential actuator moves equal to the complement of zero which is one step of movement when no key is operated in that bank or equal to the complement of one which is zero movement when a key is operated therein and special mechanism is provided therefor. In decimal calculations the tens of shillings stop bar becomes the decimal tens stop bar and can move up to nine steps on add operations and the differential can move to the same degree when complementary movement is used on subtract operations.

The novel mechanism therefore involves special control of the pence denominational order and the tens of shillings denominational order mechanisms.

The basic two total machine is shown in application for United States Letters Patent, Serial No. 95,703, filed by Harry L. Lambert, May 27, 1949. The machine of that application has differential mechanism for complementary subtraction with which applicant's novel mechanism is used. Although the Lambert machine is a decimal machine it may be modified for sterling use by keybank and totalizer mechanism shown in United States Patent 2,476,853 which issued on the application of Rowland G. Fowler, and for the purpose of understanding the invention it is to be assumed, during the following description, that the machine is arranged for separate sterling and decimal calculations, and for convenience the totalizers will hereinafter be termed the sterling and decimal totalizers, respectively.

Figure 1:
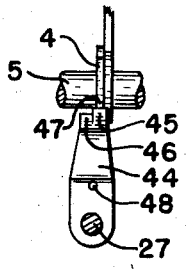
Fig. 1 is a perspective view of the selector mechanism and its relation to the differential stop bars.
Figure 2:
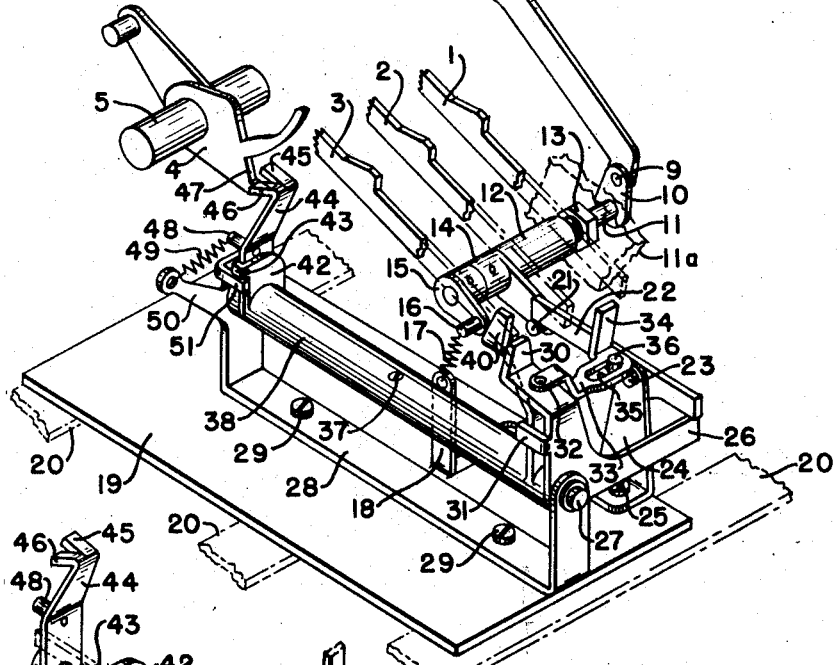
Fig. 2 is a view of a portion of the mechanism of Fig. 1, in exploded form to show the details of construction.

In the drawing, Fig. 1 is a perspective view, and Fig. 2 a detail view.

All but the first denominational bank is made up on a base of ten, with nine keys 52 (Fig. 4) and an associated stop bar, that shown in Fig. 4 being the tens of shillings stop bar 3. The lowest denominational bank is made up on a base of twelve, with eleven keys and an associated stop bar as shown in the Fowler Patent 2,476,853 to which reference has been made. Referring to Fig. 1, the lowest denominational order, or pence stop bar is indicated at 1, the units of shillings stop bar is indicated at 2, and the tens of shillings stop bar is indicated at 3. The higher order stop bars are conventional decimal stop bars.

Each stop-bar, during the operation of the machine, is permitted to move an extent determined by the value of an operated key, and, in the case of addition, to cause the equivalent amount to be added into the totalizer. In the case of subtraction, however, the stop-bar, while moving to an extent corresponding to an operated key, controls the movement of a complementary lever 4 carried on a shaft 5 so that the associated differential actuator is moved the appropriate complement of the true entry, and such is added on the totalizer. There is a complementary lever, equivalent to lever 4, for each denominational order and they are shifted from a normal position to the right, on subtract operations, where they control the stop bars to make a complementary movement, as explained in the Lambert application.

In the case of sterling calculation the tens of shillings stop-bar 3 is only required to take one step of movement either to add one unit as represented by a true addition or a complementary entry of zero.

In decimal calculation, however, the tens of shillings stop-bar 3 will be required to occupy any one of the positions "1" to "9" according to the amount to be entered, either as a direct entry or as a complement.

Arrangements are therefore provided whereby, in sterling calculations the movement of the stop-bar 3 is limited to one step, but in which the necessarily greater degree of movent is permitted for decimal calculations.

This is accomplished through the intermediary of a link 6 connected at 7 to a totalizer selecting lever 8 which is operated to effect the selection of the totalizer required in known manner similar to a corresponding lever in said Lambert application 95,703.

The other end of the link 6 is pivotally connected at 9 to a second link 10 fast with a spindle 11 which passes through the side frame 11a of the machine.

The spindle 11 carries a sleeve 12 threaded at one end and adapted to receive a nut 13 between which and the end of the sleeve the side frame 11a of the machine is located.

The spindle 11 also carries a pair of crank arms 14, 15, the latter arm 15 being provided with a pin 16 to which is connected one end of a spring 17, the other end of said spring being connected to an upstanding portion 18 of a plate 19 secured to the cross members 20 of the base of the machine.

Crank arm 14 is provided with a stud 21 which is adapted to abut the underside of one end of a lever 22 pivoted at 23 to a post 24 detachably secured to the base plate 19 by means of screw 25, the underside of the other end of lever 22 abutting the end of a bell-crank 26.

Bell-crank 26 is mounted on one end of a spindle 27 carried by a frame, indicated generally at 28, detachably secured to the base plate 19 by means of screws 29 and extending transversely to the axis of spindle 11.

The bell-crank 26, rocked clockwise from the position shown in Fig. 1 when decimal calculations are to be performed, is provided with an upstanding stop-member 30 movable into and out of the path of travel of the tens of shillings stop-bar 3, and also a lug 31, the purpose of which will be described hereinafter.

A pin 32 is also provided on the bell-crank 26 which serves to receive an extension 33 having a stop-member 34, the extension 33 being movable into and out of the path of travel of the pence stop-bar 1 through the intermediary of a slot 35 formed therein adapted to slide about a pin 36 carried by the comb-plate 36a (Fig. 4) of the machine.

Secured to the spindle 27 by means of a grub screw 37 (see Fig. 2) is a sleeve 38 formed at one end with an abutment lever 39 provided with an upstanding stop portion 40 arranged to contact the zero-stop 41 associated with the tens of shillings keybank.

The end of the sleeve 38 remote from the lever 39 is formed with an upstanding arm 42 having a bent portion 43, the purpose of which will be described hereinafter.

The end of the spindle 27 adjacent the member 42 has loosely mounted thereon a pivoted lever 44 having high and low fingers 45, 46, respectively, either of which, when selected, are adapted to engage with a slot 47 formed in the underside of the complementary lever 4 associated with the tens of shillings keybank, when lever 4 is shifted to the right for a subtract operation.

The lever 44 is also provided with a projecting pin 48 to which one end of a spring 49 is connected to urge lever 44 counter-clockwise, as seen in Fig. 1, the other end of said spring being secured to any convenient portion of the frame 28 as for example an arm 50, a frame-supported lug 51 being provided on the frame 28 adapted to act as a stop for the bent portion 43 of the arm 42 when the pivoted lever 44 is in sterling position.

When the totalizer selecting lever 8 is operated to effect the selection of the totalizer required, the linkages 6, 10, 12 and 22 will move the stop-member 30 into one of two positions, one being a sterling position where the movement of the stop-bar 3 is limited to one step of movement irrespectively of the key operated in the associated keybank, whereas in the second or demical position, the stop-member 30 will be moved completely from the path of the stop-bar 3 to permit the latter to move an extent determined by an operated key, to enter the decimal amount into the totalizer during adding operations or to control the complementary lever 4 to add in the complement of the digit represented by the operated key. Due to its connection at 32 to the stop-member 30, the stop-member 34, which in sterling position is ineffective, will in decimal position be in the path of the pence stop-bar 1 so it cannot move.

For the control of complementary entries during sterling calculations, the stop-member 30 cooperates with the pivoted lever 44 which also co-acts with the zero-stop 41, so that when one of the keys in the tens of shillings keybank is operated, the zero-stop 41 will pivot the abutment lever 39, movement of the latter pivoting the arm 42 and thus bringing the low finger 46 of lever 44 into the path of the complementary lever 4 whereby it will engage the slot 47, thus having the effect of not adding any amount into the totalizer in respect of the depressed key, but such will not prevent an accrued transfer into the tens of shillings wheel from the units shillings totalizer wheel.

Alternatively, if during subtract sterling calculation a key is not operated, the high surface 45 will remain in the path of the complementary lever 4 so that one digit is entered in the tens wheel of the shillings totalizer, and which, together with a transfer which will occur from the units of shillings denomination, will transfer a digit to the units of pounds totalizer wheel.

When the stop-member 30 is moved completely from the path of the stop-bar 3 for a decimal calculation, it carries stop member 34 in front of stop bar 1 and the lug 31 on the bell-crank 26 will pivot the abutment lever 39 and movement of the latter will be transmitted to the pivoted lever 44 through the intermediary of the sleeve 38 thus moving said lever 44 into a position wherein both the high and low fingers 45, 46, are out of the path of travel of the complementary lever 4 and thereby allow the latter to be controlled entirely from the stop-bar 3 to effect the complementary decimal entry.

Following are the results of a series of operations on the zeroized sterling totalizer, considering the five lowest denominations:

|  | Tens £ | Units £ | Tens s. | Units s. | d. |
|---|---|---|---|---|---|
| (a) Add 9£/6s./11d | 0<br>0 | 0<br>9 | 0<br>0 | 0<br>6 | 0<br>11 |
| (b) New Total | 0 | 9 | 0 | 6 | 11 |
| (c) Add 3£/17s./9d | 0 | 3 | 1 | 7 | 9 |
| (d) New Total | 1 | 3 | 0 | 4 | 8 |

The addition (a) involved no transfers. The addition (c) involved a transfer on 12 from the pence bank to the shillings bank, a transfer on 10 from the shillings bank to the tens of shillings bank, a transfer on 0 in the tens of shillings bank to the pounds bank, and a transfer from the units pounds bank to the tens of pounds bank. In this connection it is to be understood zero and one are the only digits in the tens of shillings denomination.

Now taking the new total (d) subtracting operations will be performed.

|  | Tens £ | Units £ | Tens s. | Units s. | d. |
|---|---|---|---|---|---|
| (d) Old Total | 1 | 3 | 0 | 4 | 8 |
| (e) Subtract 1£/2s./10d. by adding the complement | 9 | 8 | 1 | 7 | 2 |
| (f) Remainder | 1 | 2 | 0 | 1 | 10 |

In (e) the complement of 10d. is 2d. on the base of 12, the complement of 2s. is 7 on the base of 9, the complement of 0 in the ten shillings on the base of 1 is 1, the complement of the units of pounds on the base of 9 is 8, and the complement of 0 ten pounds on the base of 9 is 9. There is a a transfer from unit shillings to tens of shillings, from tens of shillings to units of pounds, and from units of pounds to tens of pounds. The transfer to hundreds of pounds, of course, is not shown.

Now taking the remainder (f) a subtract operation will be demonstrated involving the tens of shillings:

|  |  |  |  |  |  |
|---|---|---|---|---|---|
| (f) Remainder | 1 | 2 | 0 | 1 | 10 |
| (g) Subtract 19s., 7d. by adding complement | 9 | 9 | 0 | 0 | 5 |
| (h) New Remainder | 1 | 1 | 0 | 2 | 3 |

In (g) the complement of 7d. on the base of 12 is 5, the complement of 9 units of shillings on the base of 9 is 0, the complement of 1 tens of shillings on the base of 1 is 0, the complement of 0 units of pounds on the base of 9 is 9, and the complement of 0 tens of pounds on the base of 9 is 9. Transfers occurred from pence to units of shillings, from units pounds to tens pounds and from tens pounds to hundreds pounds, the latter, of course, not being shown.

Operations (a) to (e) were performed with totalizer selecting lever in position to select the upper or sterling totalizer. In this position the mechanism is as shown in Fig. 1 with the pence stop bar 1 unblocked by stop member 34 and free to move according to the values of an operated pence key if any is operated; with the tens of shillings stop bar 3 blocked by stop member 30 so as to have not more than one unit movement in the event a tens of shillings key is operated. In operation (a) stop bar 1 took 11 units of movement, stop bar 2 took 6 units of movement, stop bar 3 took no units of movement as its zero stop 41 was not rendered ineffective, the pound stop bar (not shown) took nine units of movement, and the stop bar for the tens of pounds (not shown) took no units of movement. On operation (a) just as the stop bar 1 for pence took 11 units of movement (conveyed directly unconverted to the complement, to the differential actuator associated therewith), in all adding operations the stop bar movement is conveyed directly to the differential actuators associated therewith.

In (c) the pence stop bar 1 moved 9 units adding 9 units to the 11 in the associated totalizer pinion, causing a transfer of a unit to the units of shillings totalizer pinion; the tens of shillings stop bar 3 moved one unit which with the transfer to the tens of shilling totalizer pinion caused a transfer to the units of pounds totalizer pinion; the units of pounds stop bar (not shown) moved three units and caused a transfer of one unit to the tens of pounds totalizer wheel. In subtracting as shown in (e) the complementary lever 4 (Fig. 1) is shifted by the subtract selection mechanism to line up with member 42 to cooperate with surface 45, the zero stop 41 being in normal effective position as a result of no key being operated in the tens of shillings keybank; the stop bar 1 for the pence bank moves 10 units, which through the complementary mechanism moves the associated differential actuator 2 units; the stop bar 2 for the units of shillings bank moves 2 units which through the complementary mechanism moves the associated differential actuator 7 units causing a transfer of a unit to the tens of shillings totalizer pinion; the tens of shillings stop bar 3 moves 0 units which through the complementary mechanism and member 42 causes the differential actuator to move one unit which with the transfer to the tens of shillings wheel causes a transfer of a unit to the units of pounds totalizer pinion; the units of pounds stop bar (not shown) moves one unit causing the corresponding differential actuator to move 8 units which causes a transfer to the tens of pounds totalizer wheel; and the tens of pounds stop bar (not shown) moves 0 units causing its differential actuator through the complementary mechanism to move 9 units. In example (g), a subtract operation, the pence stop bar moves 7 units which is converted to 5 units of movement of the differential actuator, entering 5 units of data into the pence totalizer pinion, causing a transfer to the units of shillings totalizer pinion, leaving the pence totalizer pinion at 3. The units pence stop bar moves 9 units which is converted into 0 units of movement of the associated differential rack, entering nothing in the totalizer pinion. Said pinion having been at 1 and receiving a transfer now stands at 2. The tens of shillings stop bar moves 0 units due to surface 46 acting on complementary lever 4, leaving the tens of shillings totalizer pinion at zero. The units of pounds stop bar moves 0 units which is converted to 9 units of movement of the associated differential rack and totalizer pinion, the latter being left at 1 with a transfer to the tens of pounds. The tens of pounds stop bar also is moved 0 units which is converted to 9 units of movement of the associated differential rack and totalizer pinion leaving the latter at 1 with a transfer to the next higher order. As in the other examples the pounds and tens of pounds orders are not shown in the drawings.

Next, an example of an adding operation and a subtract operation on the zeroized decimal totalizer will be given. The totalizer selecting lever 8 is moved to the decimal totalizer position which moves stop member 30 and member 42 to ineffective position and moves member 34 to where it blocks movement of pence stop bar 1. The pence keys are not used in decimal adding operations. The pence differential rack however moves on decimal subtract operations the full cappacity of the lowest order totallizer pinion which having started at zetro is returned to zero, meanwhile having transferred a unit to the next higher order totalizer pinion which is regarded as the units decimal order. Thus, although the lowest order pinion of the decimal totalizer is disregarded in reading a total it is useful in decimal subtract operations at its passes a complementary zero transfer to the lowest denominational decimal totalizer pinion. The adding operation to a cleared totalizer will be demonstrated.

|  | Thousands | Hundreds | Units | Lowest Order Disregarded |
|---|---|---|---|---|
| (a) Add 676 | 0<br>6 | 0<br>7 | 0<br>6 | 0<br>0 |
| (b) New Total | 6 | 7 | 6 | 0 |

In this operation the stop bar and differential rack of the disregarded lowest order did not move. In the units, tens, and hundreds orders the stop bars and differential actuators moved 6, 7 and 6 units respectively with no transfers.

| | | | | |
|---|---|---|---|---|
| (b) Old Total | 6 | 7 | 6 | 0 |
| (c) Add 6 | 0 | 0 | 6 | 0 |
| (d) New Total | 6 | 8 | 2 | 0 |

In this operation only the units stop bar and differential actuator moved. The 6 unit movement caused a transfer of a unit to the tens order.

| | | | | |
|---|---|---|---|---|
| (d) Old Total | 6 | 8 | 2 | 0 |
| (e) Subtract 642 | 3 | 5 | 7 | 10 |
| | 0 | 4 | 0 | 0 |

The lowest order differential rack moved ten units leaving the totalizer pinion at zero after one full revolution. (It is to be understood that ten units of movement decimally is the same as twelve units of movement of this differential actuator in sterling.) The full complementary movement is caused by stop member 34 holding stop bar 1 in home position, even though a pence key is accidentally depressed. Stop bar 2 moved 7 units (the nine's complement of 2) and the associated totalizer pinion received a transfer from the lowest order leaving it at 0. The tens differential actuator 3 moved 5 units which with the transfer from the decimal units order leaves the tens decimal pinion at 4 with a transfer to the decimal hundreds order. The decimal hundreds order actuator moved 3 units (the nine's complement of 6) and with the transfer of one unit from the decimal tens order leaves the decimal hundreds totalizer pinion at 0.

In an alternative arrangement the sterling or decimal selection can be effected by providing a manually operable selection lever for controlling the tens of shillings stop-bar 3, movable into either one of two positions, said lever projecting from the keyboard at its upper end and being connected directly to the bell-crank 26 at its lower end.

In either arrangement the stop member 30 and lever 44 are mounted in a unitary assembly which, by detaching the screws 25, 29, can be readily attached to the machine as a whole, and in the arrangement illustrated the interconnecting linkage is made to be readily disconnected at any convenient point.

It will be appreciated that, if desired, the positioning of the link 6 may be determined automatically under control of a movable record material carriage, in known manner.

What is claimed is:

1. In a calculating machine having in each of ascending denominational orders groups of individually operable digit keys, that group in the lowest order consisting of eleven pence-representing keys, that group in the second order consisting of nine units-of-shillings-representing keys, that group in the third order consisting of nine tens-of-shillings-representing keys, and those groups of the higher orders consisting of nine keys each representing units-of-pounds in ascending decimal orders; a movable stop bar for each denominational order, each of which is controlled in the extent of its movement from a normal position by the associated group of keys, according to the digit value of an operated key; a main operating means operable in a machine cycle to cause the stop bars to move under control of the associated keys; zero stop means for each stop bar, said zero stop means normally holding the associated stop bar from data-entering movement in a machine operation if no key associated therewith is operated, but movable from said holding position if an associated key is operated; a sterling totalizer including a totalizer pinion for each denominational order and transfer mechanism between each two adjacent orders for entering one unit of data during a machine operation into a higher order totalizer pinion from the next lower pinion, when required, the pence pinion having a capacity of 12 and causing a transfer in a machine cycle if it exceeds its capacity due to an entry therein, the units-of-shillings pinion having a capacity of 10 and causing a transfer in a machine cycle if its capacity is exceeded due to an entry therein, the tens-of-shillings pinion having 10 teeth causing a transfer of a unit on every second digit entry, and the pinions for the decimal orders of units-of-pounds each having a capacity of 10 and each causing a transfer in a machine cycle if it exceeds its capacity due to an entry therein; a decimal totalizer having a pinion for each of said denominational orders and transfer mechanism between each two adjacent orders for entering during a machine operation one unit of data into a higher order pinion from the next lower pinion, when required, each of said decimal totalizer pinions having a capacity of 10 and causing a transfer when during a machine cycle its capacity is exceeded, due to an entry therein; a differential actuator for each order, each actuator having a sterling rack and a decimal rack; totalizer engaging mechanism for engaging one or the other of the totalizers with its associated racks during a machine cycle for item-entering; and means selectively movable for coupling the associated stop bar and differential actuator in adding operations for giving the actuator the equivalent movement of the associated stop bar or the complement thereof for subtracting operations, the complementary movement for the lowest order being on a base of 12 for the sterling rack and on a base of 10 for the decimal rack, the complementary movement of all the other actuators being on a base of 9 for their respective racks; the combination of totalizer selecting means selectively operable to determine which totalizer shall be engaged with the differential actuators during the next ensuing machine cycle; and blocking means moved to block and thus limit the movement of the tens-of-shillings stop bar to one unit when the totalizer selecting means is set to have the sterling totalizer engage the differential actuators on the next item-entering machine operation, and said blocking means being moved to ineffective position when the totalizer selecting means is set to have the decimal totalizer engage the differential actuators on the next item-entering machine operation.

2. The machine of claim 1 in which a movable tens-of-shillings order subtract control member is provided, mounted with respect to the means coupling the tens of shillings stop bar and its associated differential actuator so it may have an ineffective position and two effective positions, the first of said two effective positions controlling the coupling means between the tens-of-shillings stop bar and its differential actuator so the differential actuator can move but one unit during a subtract operation and the second of said two effective positions controlling the coupling means between the tens-of-shillings stop bar and its differential actuator so the differential actuator cannot make a data entering move during a subtract operation, said subtract control member normally being in the first position when no tens-of-shillings key is operated and being mounted to the second position by the zero stop of the tens of shillings key bank when a tens-of-shillings key is operated.

3. The machine of claim 2 in which the tens-of-shillings order subtract control member is coupled to the totalizer selection means and is moved to ineffective position by the totalizer selection means being moved to select the decimal totalizer.

4. The machine of claim 3 in which the tens-of-shillings order subtract control member is moved to effective position by the totalizer selecting means being moved to select the sterling totalizer.

5. The machine of claim 1 in which the lowest order stop bar is a pence stop bar, and in which there is provided a movable blocking means coupled to and moved by the totalizer selection means so that when said selection means is in decimal totalizer selecting position the pence stop bar blocking means is in position to prevent any digit-entering movement of said pence stop bar.

6. The machine of claim 1, in which the lowest order stop bar is a pence stop bar, and in which there is provided a movable blocking means coupled to and moved by the totalizer selection means so that when said selection means is in sterling totalizer selecting position the pence stop-bar blocking means is in ineffective position to prevent movement of said pence stop-bar.

MAXWELL EDWARD SIME.

References Cited in the file of this patent
UNITED STATES PATENTS

| Number | Name | Date |
|---|---|---|
| 1,028,896 | Matthews | June 11, 1912 |
| 1,626,889 | Sundstrand | May 3, 1927 |
| 1,808,934 | Pasinski | June 9, 1931 |
| 1,887,259 | Simone | Nov. 8, 1932 |
| 1,931,113 | Muller | Oct. 17, 1933 |
| 2,346,249 | Bryce | Apr. 11, 1944 |
| 2,389,062 | Lambert | Nov. 13, 1945 |
| 2,428,084 | Lambert | Sept. 30, 1947 |
| 2,476,853 | Fowler | July 19, 1949 |